US012709994B1

(12) United States Patent
Landry-Drolet et al.

(10) Patent No.: US 12,709,994 B1
(45) Date of Patent: Aug. 18, 2026

(54) FAILURE DETECTION OF AN OIL TRANSFER SEAL

(71) Applicant: Pratt & Whitney Canada Corp., Longueuil (CA)

(72) Inventors: Guillaume Landry-Drolet, Boucherville (CA); Michel Desjardins, Saint-Hubert (CA); Thibaut Edmond J Duchene, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/187,430

(22) Filed: Apr. 23, 2025

(51) Int. Cl.
*F01D 25/18* (2006.01)
*F01D 25/20* (2006.01)

(52) U.S. Cl.
CPC ........... *F01D 25/183* (2013.01); *F01D 25/20* (2013.01); *F05D 2240/55* (2013.01); *F05D 2260/98* (2013.01); *F05D 2270/301* (2013.01)

(58) Field of Classification Search
CPC .... F01D 25/183; F01D 25/20; F05D 2260/98; F05D 2240/55; F05D 2270/301
See application file for complete search history.

(56) References Cited

U.S. PATENT DOCUMENTS 4,792,911 A * 12/1988 Gonzalez ................ H02K 9/24 702/185
6,626,436 B2 * 9/2003 Pecht .................. F16J 15/3492 277/318
7,086,275 B2 * 8/2006 Bock ...................... G01M 3/16 73/40
7,137,590 B2 * 11/2006 Sandrart ................ B64C 27/12 244/17.25
8,344,676 B2 * 1/2013 Bandaru .................. H02K 9/24 310/59
8,564,237 B2 * 10/2013 Bandaru ................ G01M 3/28 310/59
8,651,801 B2 * 2/2014 Shamseldin ......... F16J 15/3484 415/112
9,790,952 B2 * 10/2017 Shamseldin ......... F16J 15/3492
10,024,753 B2 * 7/2018 Rhee .................. G01M 3/2869
2001/0030396 A1 * 10/2001 Pecht .................. F16J 15/3492 277/317

(Continued)

*Primary Examiner* — Henry Y Liu
(74) *Attorney, Agent, or Firm* — CANTOR COLBURN LLP

(57) ABSTRACT

A lubricant transfer arrangement of a gas turbine engine includes a first rotationally fixed component, a second component configured to rotate about an engine central axis of the gas turbine engine, and a lubricant transfer seal positioned radially between the first component and the second component. The lubricant transfer seal is configured to direct a flow of lubricant from a first location at the first component to a second location at the second component. The lubricant transfer seal is rotationally fixed and configured to seal to at least one of the first component and the second component. A lubricant pressure sensor is operatively connected to sense a lubricant pressure in a lubricant pathway fluidly upstream of the lubricant transfer seal. A controller receives a signal from the lubricant pressure sensor. The signal is indicative of the pressure in the lubricant pathway fluidly upstream of the lubricant transfer seal.

20 Claims, 3 Drawing Sheets

(56) References Cited

U.S. PATENT DOCUMENTS

| | | | | |
|---|---|---|---|---|
| 2004/0227302 | A1* | 11/2004 | Burdick | F16J 15/004<br>277/510 |
| 2009/0290971 | A1* | 11/2009 | Shamseldin | F04D 29/124<br>415/118 |
| 2023/0120797 | A1* | 4/2023 | Muldoon | F02C 7/32<br>60/39.08 |

* cited by examiner

FAILURE DETECTION OF AN OIL TRANSFER SEAL

FIELD

This application pertains to the art of aircraft engines, and in particular to oil systems of aircraft engines.

BACKGROUND

Oil is circulated in aircraft engines to lubricate components such as bearings and other portions of the aircraft engine. In some systems, the oil flow is transferred from an oil passage into an interior of a rotating shaft of the engine. One or more seals, so called oil transfer seals, are utilized to direct the flow of oil to selected engine locations and/or passages to provide lubrication for the components of the engine. Failure of an oil transfer seal allows leakage of oil from its intended path and deprives lubricant from the intended components. This may result in shortening of service life of the components and/or the engine.

SUMMARY

In one embodiment, a lubricant transfer arrangement of a gas turbine engine includes a first rotationally fixed component, a second component configured to rotate about an engine central axis of the gas turbine engine, and a lubricant transfer seal positioned radially between the first component and the second component. The lubricant transfer seal is configured to direct a flow of lubricant from a first location at the first component to a second location at the second component. The lubricant transfer seal is rotationally fixed and configured to seal to at least one of the first component and the second component. A lubricant pressure sensor is operatively connected to sense a lubricant pressure in a lubricant pathway fluidly upstream of the lubricant transfer seal. A controller receives a signal from the lubricant pressure sensor. The signal is indicative of the pressure in the lubricant pathway fluidly upstream of the lubricant transfer seal.

Additionally or alternatively, in this or other embodiments the controller is configured to identify a drop in the lubricant pressure sensed by the lubricant pressure sensor as being indicative of damage to the oil transfer seal.

Additionally or alternatively, in this or other embodiments a lubricant pressure pump is configured to urge the flow of lubricant through the lubricant transfer seal.

Additionally or alternatively, in this or other embodiments one or more first seal elements are configured to seal between the lubricant transfer seal and the second component.

Additionally or alternatively, in this or other embodiments one or more second seal elements are configured to seal between the lubricant transfer seal and the first component.

Additionally or alternatively, in this or other embodiments one or more component pathways are formed in the first component to convey the flow of lubricant along the first component.

Additionally or alternatively, in this or other embodiments one or more transfer seal pathways are configured to direct the flow of lubricant from the first component to the second component via the lubricant transfer seal.

Additionally or alternatively, in this or other embodiments the second component is a shaft of the gas turbine engine. A lubricant transfer sleeve is positioned between the shaft and the lubricant transfer seal. The lubricant transfer sleeve has one or more sleeve passages defined therein to transfer the flow of lubricant to a sleeve cavity between the shaft and the lubricant transfer sleeve.

In another embodiment, a gas turbine engine includes a combustor, a turbine rotationally driven about an engine central axis of the gas turbine engine by combustion products of the combustor, and a lubricant transfer arrangement. The lubricant transfer arrangement includes a first rotationally fixed component, a second component configured to rotate, and a lubricant transfer seal positioned radially between the first component and the second component configured to direct a flow of lubricant from a first location at the first component to a second location at the second component. The lubricant transfer seal is rotationally fixed and is configured to seal to at least one of the first component and the second component. A lubricant pressure sensor is positioned along a lubricant pathway fluidly upstream of the lubricant transfer seal. A drop in a lubricant pressure measured by the lubricant pressure sensor is indicative of damage to or failure of the oil transfer seal.

Additionally or alternatively, in this or other embodiments a lubricant pressure pump is configured to urge the flow of lubricant through the lubricant transfer seal.

Additionally or alternatively, in this or other embodiments one or more first seal elements are configured to seal between the lubricant transfer seal and the second component.

Additionally or alternatively, in this or other embodiments one or more second seal elements are configured to seal between the lubricant transfer seal and the first component.

Additionally or alternatively, in this or other embodiments one or more component pathways are formed in the first component to convey the flow of lubricant along the first component.

Additionally or alternatively, in this or other embodiments one or more transfer seal pathways are configured to direct the flow of lubricant from the first component to the second component via the lubricant transfer seal.

Additionally or alternatively, in this or other embodiments the second component is an output shaft of the gas turbine engine.

Additionally or alternatively, in this or other embodiments a lubricant transfer sleeve is positioned between the output shaft and the lubricant transfer seal. The lubricant transfer sleeve has one or more sleeve passages defined therein to transfer the flow of lubricant to a sleeve cavity between the shaft and the lubricant transfer sleeve.

In yet another embodiment, a lubrication system of a gas turbine engine includes a lubricant flow circuit, including a lubricant supply and a lubricant transfer seal positioned between a rotationally fixed component of the gas turbine engine and a rotating component of the gas turbine engine. The lubricant transfer seal has one or more transfer seal passages to direct a flow of lubricant to the rotating component. A lubricant pressure is positioned along the lubricant flow circuit configured to measure a pressure of the flow of lubricant in the lubricant flow circuit. A drop in the measured pressure is indicative of damage to or failure of the lubricant transfer seal.

Additionally or alternatively, in this or other embodiments a lubricant pressure pump is positioned between the lubricant supply and the lubricant pressure sensor to urge the flow of lubricant along the lubricant flow circuit.

Additionally or alternatively, in this or other embodiments the lubricant pressure sensor is operably connected to an engine control system of the gas turbine engine, the engine control system configured to compare the measured pressure of the flow of lubricant to a pressure threshold.

Additionally or alternatively, in this or other embodiments an alert is positioned in a cockpit of an aircraft configured to activate when the measured pressure is below the pressure threshold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
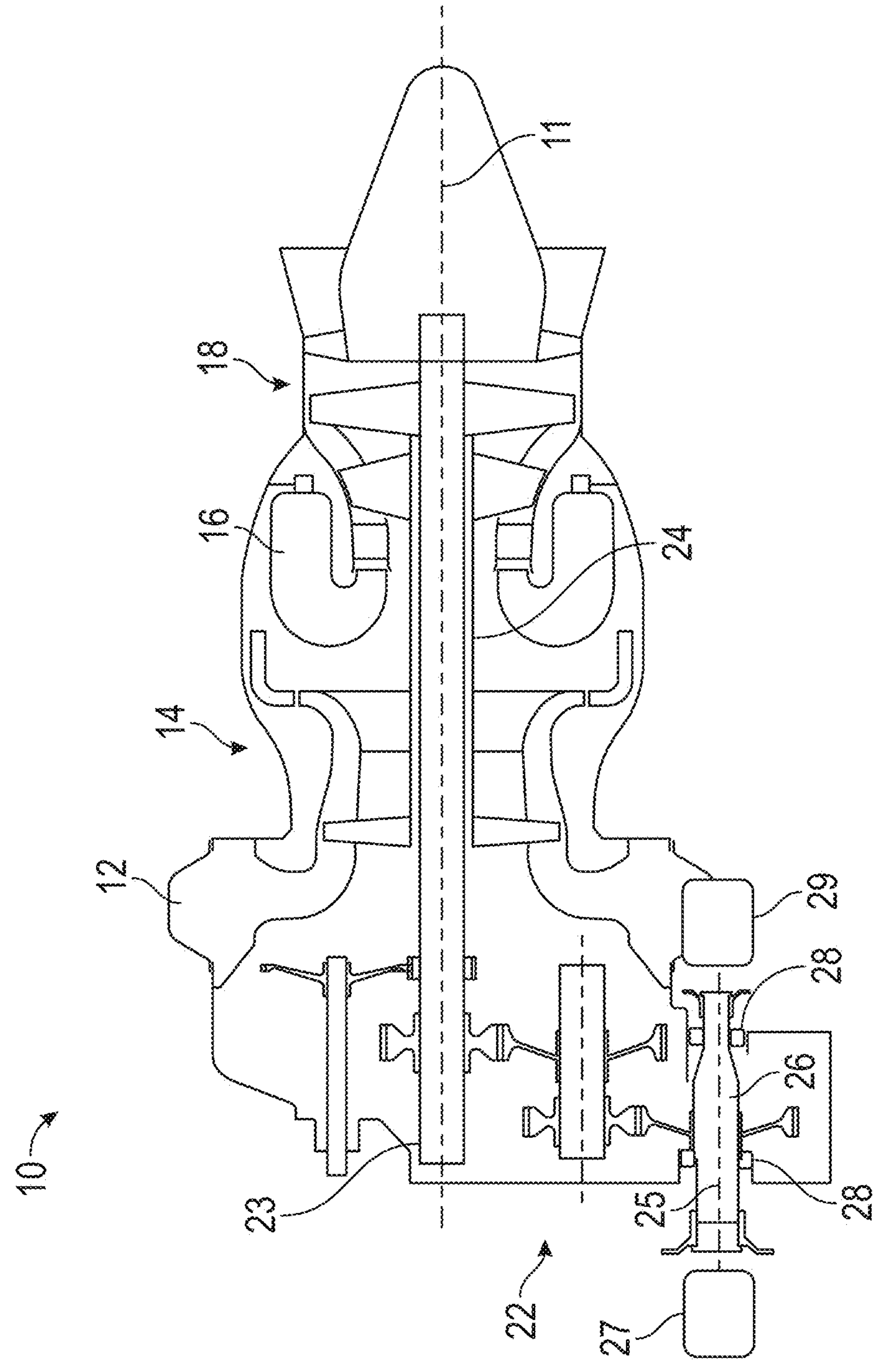
FIG. 1 is a schematic cross-sectional view of an embodiment of a gas turbine engine.

FIG. 1 illustrates a gas turbine engine 10 of a type preferably provided for use in subsonic flight, generally comprising in serial flow communication an inlet 12 through which ambient air enters the gas turbine engine 10, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14, and the turbine section 18 are rotatable about a central axis 11 of the engine 10.

A low pressure shaft 23 is drivingly connected to low pressure rotor(s) of the turbine section 18, and the high pressure rotor(s) of the compressor section 14 is/are drivingly connected to high pressure rotor(s) of the turbine section 18 through a high pressure shaft 24 concentrically surrounding the low pressure shaft 23.

The gas turbine engine 10 is, in some embodiments, utilized to propel a helicopter, and may include a transfer gear box 22 operably connected to an output through shaft 26, which rotates about a shaft axis 25 offset from the central axis 11. The output through shaft 26 is supported by bearings 28, and is in turn operably connected to a main rotor gearbox 27 at a first end of the output through shaft 26 and a tail rotor gearbox 29 at a second end of the output through shaft 26. In the illustrated embodiment, the output through shaft 26 is operably connected to and driven by the low pressure shaft 23, but one skilled in the art will appreciate that in other embodiments, the output through shaft 26 may be connected to an driven by other types of powerplant (e.g. hydrogen, hybrid electric, electric, other gas turbine engine configuration).

One skilled in the art will readily appreciate that this configuration is merely exemplary, and that in other embodiments the bearing and shaft arrangement discussed herein may relate to, for example, bearings 28 supportive of different components of the engine 10, such as the high- or low-pressure shafts 24,23 and components of a gearbox of the gas turbine engine 10. Those bearings 28 may be located within bearing cavities, which may be connected to a source of lubricant for cooling and lubricating the bearings. In some cases, the bearing cavities are connected to a source of compressed air, such as a stage of the compressor section 14, for maintaining a pressure outside the bearing cavities greater than that inside them to limit leakage of lubricant. In the description below, the terms "lubricant" and "oil" are used interchangeably.

Figure 2:
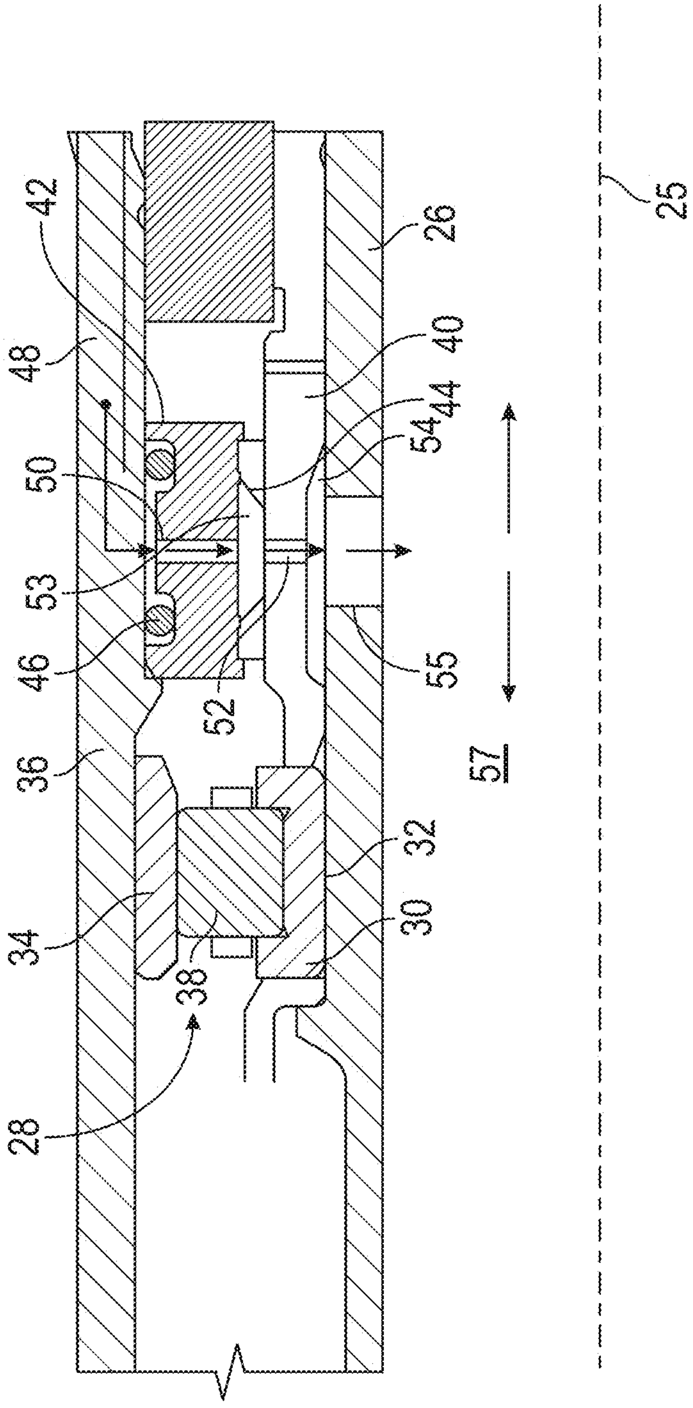
FIG. 2 is a schematic illustration of an embodiment of a lubricant transfer arrangement of a gas turbine engine.

Referring now to FIG. 2, shown is an exemplary embodiment of an embodiment of a shaft 26 and bearing 28 arrangement. The shaft 26 is configured to rotate about the shaft axis 25, and is supported at least by the bearing 28. The bearing 28 has a bearing inner race 30 located at a shaft outer surface 32 of the shaft 26. A bearing outer race 34 is located radially outboard of the bearing inner race 30 and is disposed at, for example, fixed component 36. One or more bearing elements 38 are located radially between the bearing inner race 30 and the bearing outer race 34. An oil transfer sleeve 40 is located at the shaft outer surface 32, and in some embodiments axially abuts the bearing inner race 30. In some embodiments, such as illustrated, the oil transfer sleeve 40 is separate from the shaft 26, while in other embodiments the oil transfer sleeve 40 is formed as an integral portion of the shaft 26. The oil transfer sleeve 40 is connected to and rotates with shaft 26 about the shaft axis 25. An oil transfer seal 42 is located radially outboard of the oil transfer sleeve 40, radially between the oil transfer sleeve 40 and the fixed component 36. The oil transfer seal 42 is a rotationally fixed element and includes first seal elements 44, such as lip seals, brush seals, non-contacting seals or the like to seal between the oil transfer seal 42 and the oil transfer sleeve 40. Additionally, the oil transfer seal 42 may include second seal elements 46, such as bulb seal elements or the like, to seal between the oil transfer seal 42 and the fixed component 36.

The fixed component 36 includes one or more component passages 48 that conveys a flow of pressurized lubricant, such as oil, therethrough. The component passages 48 is fluidly connected to one or more seal passages 50 extending through the oil transfer seal 42 toward the oil transfer sleeve 40. In some embodiments, the one or more seal passages 50 extend radially inwardly through the oil transfer seal 42. The one or more seal passages 50 are in fluid communication with one or more sleeve passages 52 extending through the oil transfer sleeve 40 to supply lubricant to a sleeve cavity 54 defined between the shaft 24 and the oil transfer sleeve 40. In some embodiments, a seal cavity 53 is defined between the oil transfer seal 42 and the oil transfer sleeve 40 to convey the pressurized lubricant from the seal passages 50 to the sleeve passages 52. From the sleeve cavity 54, the pressurized lubricant is urged through a shaft opening 55 in the shaft 26 into an interior 57 of the shaft and toward one or more downstream components, such as bearings, splines or the like.

Figure 3:
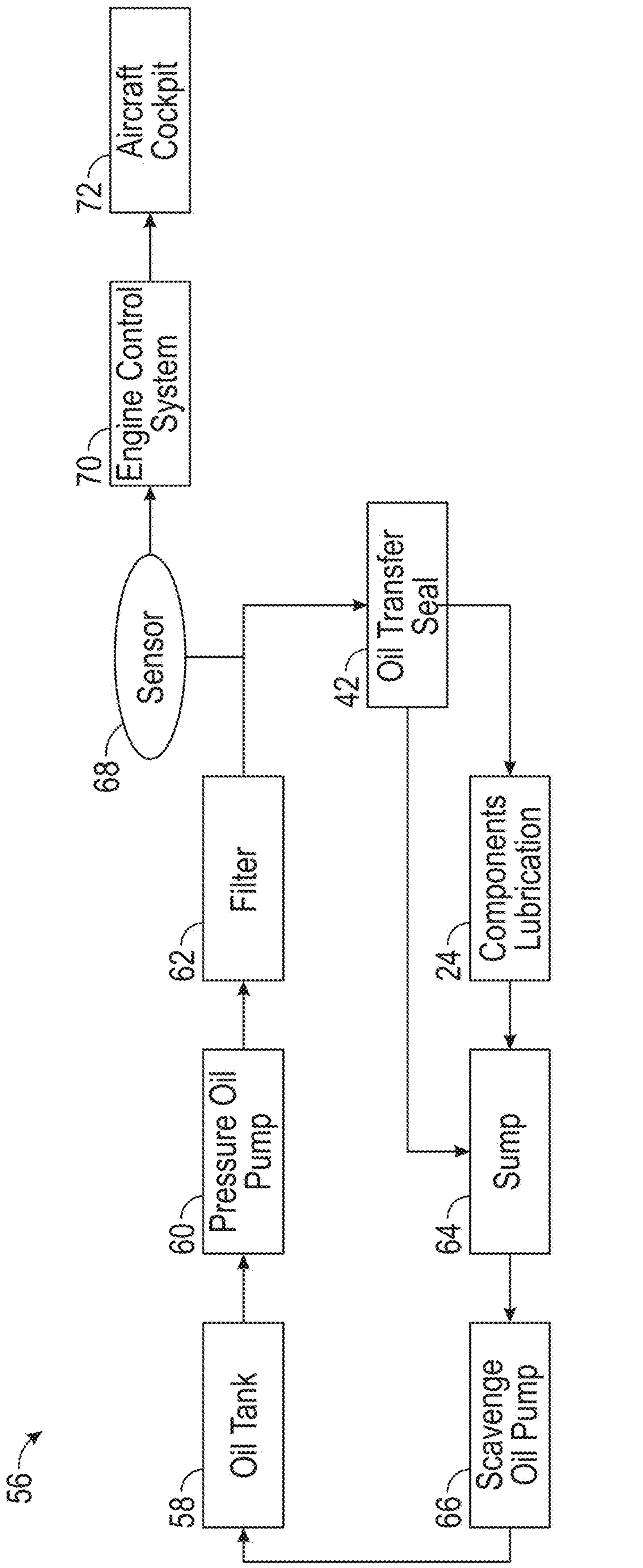
FIG. 3 is a schematic illustration of an embodiment of a lubrication system of a gas turbine engine.

Referring now to FIG. 3, a schematic illustration of an embodiment of a lubrication system 56 is illustrated. The lubrication system 56 includes an oil supply, such as oil tank 58, and a pressure oil pump 60 configured to urge the flow of lubricant through the lubrication system 56. The flow of lubricant is directed through a filter 62 and through the oil transfer seal 42 and then to the components to be lubricated, such as through the oil transfer sleeve 40 and through the sleeve cavity 54. From the components to be lubricated, the flow of lubricant is recovered at a lubricant sump 64, and urged as needed toward the oil tank via a scavenge oil pump 66. During operation of the lubrication system 56, the first seal elements 44 and the second seal elements 46 of the oil transfer seal 42 may be subject to wear and/or other damage, which results in leakage of the flow of lubricant from the intended flow pathway, so that flow of lubricant is reduced through the sleeve passages 52, which may result in insufficient lubrication.

To detect the failure of the first seal elements 44 and the second seal elements 46, an oil pressure sensor 68 is located along the lubricant flowpath fluidly upstream of the oil transfer seal 42. The oil pressure sensor 68 is configured to detect the pressure of the flow of lubricant in the lubrication system 56 downstream of the pressure pump 60 and upstream of the oil transfer seal 42. With a drop of the oil pressure below a pressure threshold indicating failure or damage to the oil transfer seal 42, and in particular damage to or failure of the first seal elements 44 or second seal elements 46. The oil pressure sensor 68 is operably connected to an engine control system 70 that evaluates the signal from the oil pressure sensor 68 and in some embodiments compares the measured oil pressure to an oil pressure threshold. An indicator, such as a light or audio alarm, or a display of actual oil pressure versus the oil pressure threshold in the aircraft cockpit 72 may be activated when the measured oil pressure by the oil pressure sensor 68 falls below the oil pressure threshold. Component passages 48, seal passages 50, sleeve passages 52 and shaft passages 55 are configured and sized via, for example, passage diameter and/or area, such that a leakage flow through seal element 44 results a pressure drop such that the measured oil pressure drops below the oil pressure threshold prior to having insufficient flow to the downstream components.

Monitoring of the oil pressure via the oil pressure sensor 68 provides early detection of wear or failure of the oil transfer seal 42 to allow the issue to be addressed before significant damage to other components of the gas turbine engine 10 occurs.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lubricant transfer arrangement of a gas turbine engine, comprising:

a first rotationally fixed component;

a second component configured to rotate about an engine central axis of the gas turbine engine;

a lubricant transfer seal disposed radially between the first component and the second component configured to direct a flow of lubricant from a first location at the first component to a second location at the second component, wherein the lubricant transfer seal is rotationally fixed and configured to seal to at least one of the first component and the second component; and a lubricant pressure sensor operatively connected to sense a lubricant pressure in a lubricant pathway fluidly upstream of the lubricant transfer seal; and a controller receiving a signal from the lubricant pressure sensor, the signal being indicative of the pressure in the lubricant pathway fluidly upstream of the lubricant transfer seal.

2. The lubricant transfer arrangement of claim 1, wherein the controller is configured to identify a drop in the lubricant pressure sensed by the lubricant pressure sensor as being indicative of damage to the oil transfer seal.

3. The lubricant transfer arrangement of claim 1, further comprising a lubricant pressure pump configured to urge the flow of lubricant through the lubricant transfer seal.

4. The lubricant transfer arrangement of claim 1, further comprising one or more first seal elements to seal between the lubricant transfer seal and the second component.

5. The lubricant transfer arrangement of claim 4, further comprising one or more second seal elements to seal between the lubricant transfer seal and the first component.

6. The lubricant transfer arrangement of claim 1, further comprising one or more component pathways formed in the first component to convey the flow of lubricant along the first component.

7. The lubricant transfer arrangement of claim 1, further comprising one or more transfer seal pathways to direct the flow of lubricant from the first component to the second component via the lubricant transfer seal.

8. The lubricant transfer arrangement of claim 1, wherein the second component is a shaft of the gas turbine engine; and further comprising a lubricant transfer sleeve disposed between the shaft and the lubricant transfer seal, the lubricant transfer sleeve having one or more sleeve passages defined therein to transfer the flow of lubricant to a sleeve cavity between the shaft and the lubricant transfer sleeve.

9. A gas turbine engine, comprising:

a combustor;

a turbine rotationally driven about an engine central axis of the gas turbine engine by combustion products of the combustor; and a lubricant transfer arrangement including:

a first rotationally fixed component;

a second component configured to rotate;

a lubricant transfer seal disposed radially between the first component and the second component configured to direct a flow of lubricant from a first location at the first component to a second location at the second component, wherein the lubricant transfer seal is rotationally fixed and configured to seal to at least one of the first component and the second component; and a lubricant pressure sensor disposed along a lubricant pathway fluidly upstream of the lubricant transfer seal;

wherein a drop in a lubricant pressure measured by the lubricant pressure sensor is indicative of damage to or failure of the oil transfer seal.

10. The gas turbine engine of claim 9, further comprising a lubricant pressure pump configured to urge the flow of lubricant through the lubricant transfer seal.

11. The gas turbine engine of claim 9, further comprising one or more first seal elements to seal between the lubricant transfer seal and the second component.

12. The gas turbine engine of claim 11, further comprising one or more second seal elements to seal between the lubricant transfer seal and the first component.

13. The gas turbine engine of claim 9, further comprising one or more component pathways formed in the first component to convey the flow of lubricant along the first component.

14. The gas turbine engine of claim 9, further comprising one or more transfer seal pathways to direct the flow of lubricant from the first component to the second component via the lubricant transfer seal.

15. The gas turbine engine of claim 9, wherein the second component is an output shaft of the gas turbine engine.

16. The gas turbine engine of claim 15, further comprising a lubricant transfer sleeve disposed between the output shaft and the lubricant transfer seal, the lubricant transfer sleeve having one or more sleeve passages defined therein to transfer the flow of lubricant to a sleeve cavity between the shaft and the lubricant transfer sleeve.

17. A lubrication system of a gas turbine engine, comprising:

a lubricant flow circuit, including:

a lubricant supply; and a lubricant transfer seal disposed between a rotationally fixed component of the gas turbine engine and a rotating component of the gas turbine engine, the lubricant transfer seal having one or more transfer seal passages to direct a flow of lubricant to the rotating component; and a lubricant pressure sensor disposed along the lubricant flow circuit configured to measure a pressure of the flow of lubricant in the lubricant flow circuit;

wherein a drop in the measured pressure is indicative of damage to or failure of the lubricant transfer seal.

18. The lubrication system of claim 1, further comprising a lubricant pressure pump disposed between the lubricant supply and the lubricant pressure sensor to urge the flow of lubricant along the lubricant flow circuit.

19. The lubrication system of claim 1, wherein the lubricant pressure sensor is operably connected to an engine control system of the gas turbine engine, the engine control system configured to compare the measured pressure of the flow of lubricant to a pressure threshold.

20. The lubrication system of claim 3, further comprising an alert disposed in a cockpit of an aircraft configured to activate when the measured pressure is below the pressure threshold.

* * * * *